UNITED STATES PATENT OFFICE.

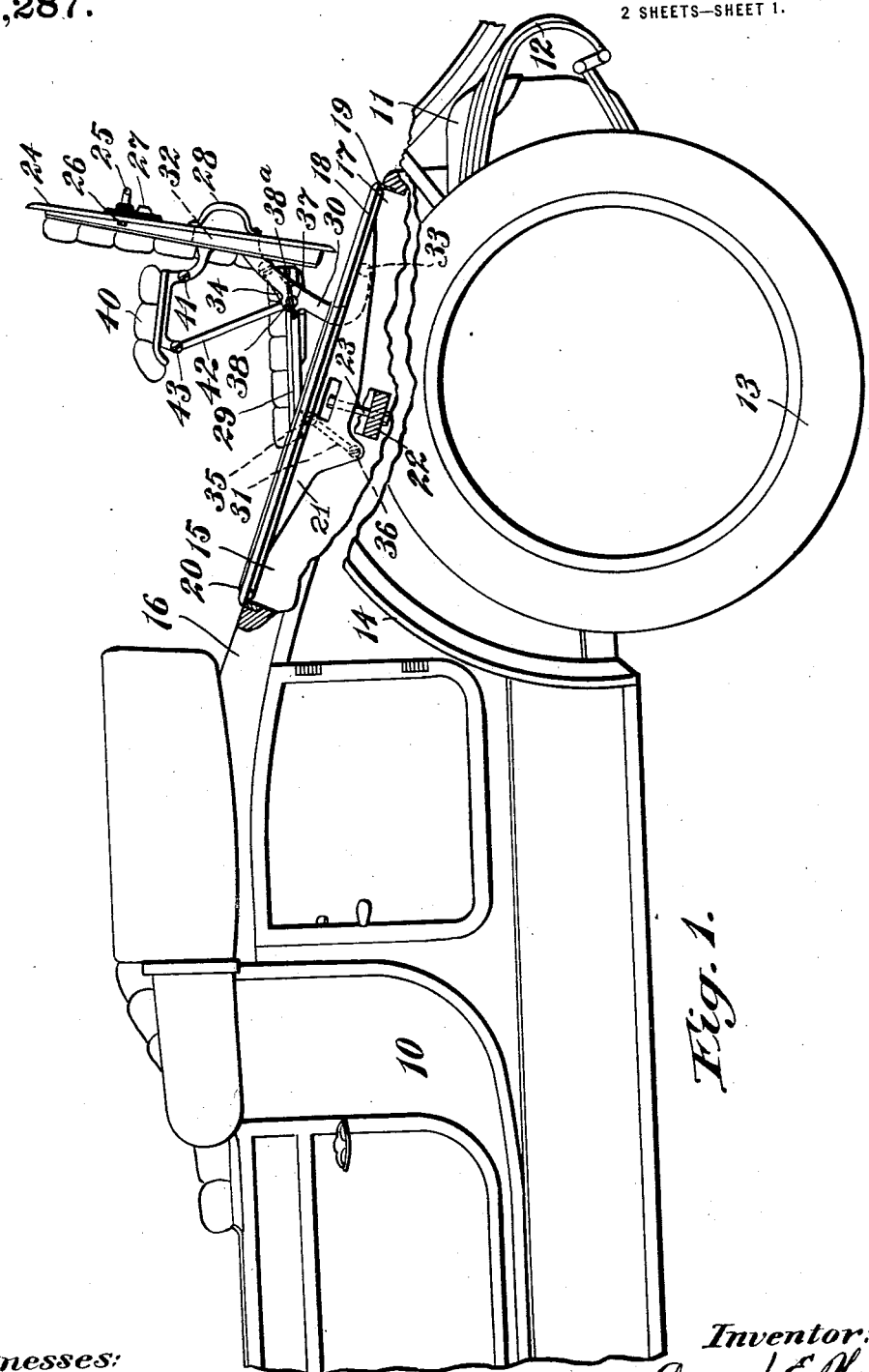

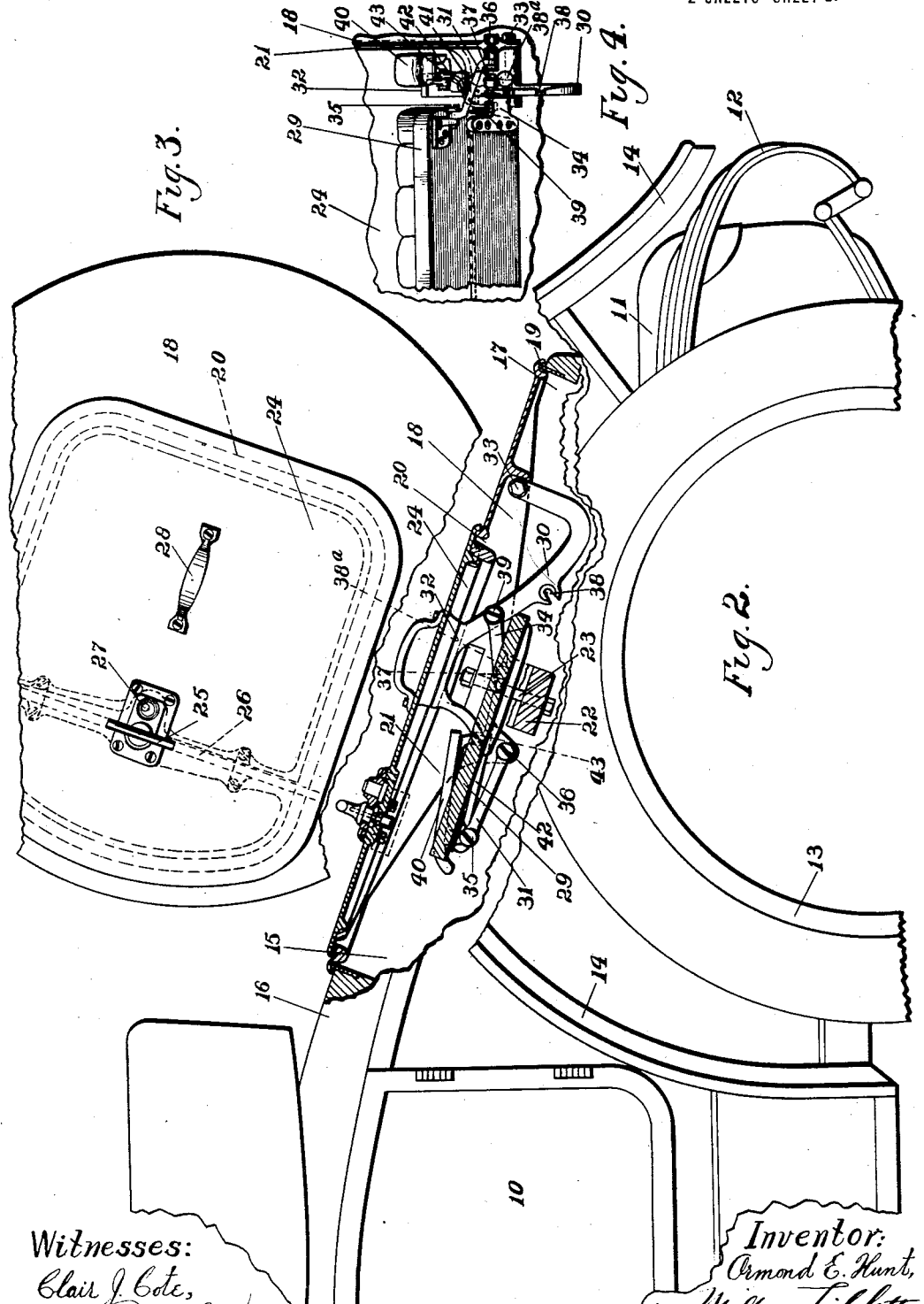

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,160,287.  Specification of Letters Patent.  Patented Nov. 16, 1915.

Application filed December 26, 1913. Serial No. 808,926.

*To all whom it may concern:*

Be it known that I, ORMOND E. HUNT, a citizen of the United States, and resident of Detroit, Wayne county, State of Michigan, have invented certain new and useful Improvements in Motor-Vehicles, of which the following is a specification.

This invention relates to motor vehicles and particularly to folding seats and seat supports therefor.

One of the objects of the invention is to provide a motor vehicle body with a seat that folds through an opening in the top of the body and with a seat back that covers said opening as the seat is folded.

Another object of the invention is to provide a motor vehicle body having a top opening in one of its compartments with a cover for said opening, said cover having an opening therein, and a seat secured to said cover and adapted to fold through said latter opening.

Another object of the invention is to provide a seat support having an opening therein with a folding seat adapted when in open position to be entirely on one side of said support and when folded to be entirely on the other side of said support.

Another object of the invention is to provide a motor vehicle body having an opening therein, with a folding seat which is adapted to fold through and inside of the opening and which when in open position, leaves an appreciable space between the front edge of the seat and the front edge of the opening so that a person sitting in the seat will have plenty of leg room through the opening.

Another object of the invention is to produce an inexpensive but strong folding seat construction for motor vehicle use.

Other objects of the invention will appear from the following description taken in connection with the drawings which form a part of this specification and in which:

Figure 1 is a side elevation of the rear part of a motor vehicle embodying the invention, parts of the body being cut away, and the folding seat being shown in open position; Fig. 2 is an enlarged view similar to Fig. 1 with the seat in folded position; Fig. 3 is a plan view projected from Fig. 2 and illustrating the seat support and the cover which forms the seat back; and Fig. 4 is a fragmentary front view of the seat shown in Fig. 2.

Referring to the drawings, 10 represents the vehicle body supported upon the frame 11; 12 are the rear springs and 13 the wheels. The rear fender over the wheel 13 is shown at 14.

The body 10 has a compartment 15 which has a top 16 which may be substantially horizontal or somewhat slanting as shown in the drawings, and this top is provided with an opening 17 shown as of circular form. This opening 17 is closed by a cover 18 which in the present invention also forms a support for the folding seat hereinafter described. The cover 18 is preferably made in the form of an aluminum casting having a flange 19 adapted to fit closely the edge of the opening 17 to make the compartment 15 comparatively tight. The cover 18 is also formed with an opening 20 therein which opening is substantially rectangular with the exception perhaps of its forward edge which may follow the curvature of the cover 18. The cover 18 moreover, is formed with integral inwardly extending ribs or arms 21 one of which may be arranged at each side of the opening 20, this rib or arm being for the purpose of strengthening the casting, for securing the cover in position, and for supporting the folding seat hereinafter described.

Inside of the compartment 15 and at about the center of the opening 17 a bar 22 extends across the body compartment being secured rigidly to or forming a part of said body. To this bar the cover or seat support 18 is removably secured as by the bolts 23 which pass through the bar and through portions of the ribs or arms 21 as shown particularly in Figs. 1 and 2. It will be understood that the bolts 23 are accessible through the opening 20 in the cover 18 and so long as these bolts are in place the cover is rigidly secured to and forms a part of the top 16 of the compartment 15. By removing the bolts 23 the entire cover or seat support 18 may be removed and with it the folding seat and contiguous parts hereinafter described.

The opening 20 in the cover 18 may be closed by a plate or cover 24 which may, as shown in this embodiment of the invention, form a back for the seat hereinafter described. This cover may be upholstered for this purpose as shown particularly in Fig. 1. The cover or plate 24 may be locked in its closed position by means of the handle 25, bolts 26 and lock 27 shown particularly in Figs. 2 and 3. A handle 28 may be secured to the outside of the cover 24 for the purpose of lifting it to open position.

The seat 29 is shown in folded position in Fig. 2 and in open position in Fig. 1, and when folded, it will be seen that it is entirely inside of the compartment 15 and therefore entirely on the inside of the support 18, while in its open position, it is outside of the compartment and therefore outside of the support 18. In the latter position it will be observed that there is a considerable space left between the front edge of the seat 29 and the front edge of the opening 20 thus giving plenty of leg room for the occupant of the seat. The seat 29 is supported entirely upon the seat support 18 through a pair of bent arms 30 and a pair of links 31. The arms 30 are rigidly secured to the plate or cover 24 as shown at 32 and they are pivoted to the inside wall of the cover 18 as at 33, thus in effect forming hinge brackets for the plate 24. The seat 29 is pivotally connected at 39 to the arms 30 through a pair of brackets 34 secured to the seat 29 and the links 31 are pivotally connected to the front edge of the seat 29 as at 35 and to the cover arms 21 as at 36.

Mounted in the brackets 34 are pins 37 which extend laterally from the brackets 34, both of the ends being threaded, and one of the ends being adapted to enter notches 38 formed in the bent arms 30 a short distance from the points 39. As the seat 29 reaches its open position as shown in Fig. 1, one end of each of these pins enters the notches 38, and are there secured by means of the nuts 38ª which are threaded on the pins 37. Thus the pins and their securing means act as a stop to prevent the seat from opening farther, and assist in supporting the seat 29 when in open position.

The seat is provided with folding arms 40 which are connected respectively to the plate 24 at 41 and by means of a link 42 to the seat 29, the link being pivoted to the arm at 43 and to the seat on one of the ends of the laterally extending pins 37.

It is believed that the operation of moving the seat from folded to open position and vice versa, will be apparent from the illustrations without further detailed description thereof.

While I have herein described in some detail a specific embodiment of my invention which I deem to be new and advantageous and which I will specifically claim, I do not desire it to be understood that my invention is limited to the exact details of the construction shown, as it will be apparent that changes may be made therein without departing from the spirit or scope of my invention.

Having thus described my invention, what I claim and desire to secure by Letters Patent is:—

1. In a motor vehicle, the combination with the body having a compartment with a top opening therein, of a detachable cover for said opening, and a folding seat supported by said cover and removable from the body therewith.

2. In a motor vehicle, the combination with the body having a compartment with a top opening therein, of a detachable cover for said opening, said cover having an opening therein, and a folding seat carried by said cover and including means adapting it to fold through the latter opening.

3. In a motor vehicle, the combination with the body having a compartment with a top opening therein, of a detachable cover for said opening, said cover having an opening therein, and a folding seat carried by said cover and including means adapting it to fold through the latter opening, the back of said seat forming a cover for said latter opening when the seat is folded.

4. In a motor vehicle, the combination with the body having a compartment with a top opening therein, of a cover for said opening, means for detachably securing said cover to the body over said opening, said cover having an opening therein, a cover for the latter said opening, a seat bottom, and pivoted connections between said covers and said seat bottom.

5. In a motor vehicle, the combination with the body having a compartment with a top opening therein, of a cover for said opening, means for detachably securing said cover to the body over said opening, said cover having an opening therein, a cover for the latter said opening, a seat bottom, pivoted to the latter said cover and having a link connection with the former cover, and a pivotal connection between the covers.

6. In a motor vehicle, the combination with the body having a compartment with a top opening therein, of a cover for said opening having inwardly extending arms, means attached to said arms for detachably connecting said cover to the body over said opening, said cover having an opening therein, and a seat having means adapting it to fold through said opening and supported by said cover with connections to said arms.

7. In a motor vehicle, the combination with the body having a compartment with a top opening therein, of a cover for said opening having inwardly extending arms, means attached to said arms for detachably connecting said cover to the body over said opening, and a folding seat having means connected to said arms and wholly supported by said cover.

8. The combination with a support, of a seat back pivoted thereto, a seat connected to said support and pivoted to said seat back, said seat and seat back adapted to assume folded and open positions, and a second connection between said seat and said back when the parts are in open position.

9. The combination with a support, of a seat back pivoted thereto, a seat connected to said support and pivoted to said seat back, said seat and seat back adapted to move together and assume folded and open positions, and a second connection automatically coming into operation between the seat and seat back as the parts assume open position.

10. In a motor vehicle, the combination with a body having a substantially circular opening therein, of a circular metal casting forming a cover for said opening and having integral arms, means connected to said arms for detachably securing said casting to the body over said opening, said casting having an opening therein, a cover for the latter said opening adapted to form a seat back, arms secured to the latter said cover and pivoted to the inside of said casting, and a seat pivoted to the latter said arms and having link connection with said integral arms.

In testimony whereof I affix my signature in the presence of two witnesses.

ORMOND E. HUNT.

Witnesses:
  Geo. E. Goddard,
  Le Roi J. Williams.